(12) United States Patent
Chatterjee et al.

(10) Patent No.: US 10,928,775 B2
(45) Date of Patent: Feb. 23, 2021

(54) 3D HOLOGRAPHIC DISPLAY AND HOLOGRAPHIC OBJECT FORMATION

(71) Applicant: INTERNATIONAL BUSINESS MACHINES COPORATION, Armonk, NY (US)

(72) Inventors: Kausik Chatterjee, Kolkata (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 16/038,130

(22) Filed: Jul. 17, 2018

(65) Prior Publication Data

US 2020/0026238 A1 Jan. 23, 2020

(51) Int. Cl.
*G03H 1/08* (2006.01)
*H04N 5/74* (2006.01)
*G03H 1/26* (2006.01)
*G03H 1/22* (2006.01)

(52) U.S. Cl.
CPC .................. *G03H 1/08* (2013.01); *G03H 1/22* (2013.01); *G03H 1/26* (2013.01); *H04N 5/74* (2013.01)

(58) Field of Classification Search
CPC .. G03H 1/08; G03H 1/26; G03H 1/22; H04N 5/74
See application file for complete search history.

(56) References Cited

U.S. PATENT DOCUMENTS

| 6,621,605 | B1 * | 9/2003 | Grossetie | ................. G03H 1/08 |
| | | | | 359/9 |
| 8,847,919 | B2 | 9/2014 | Krah | |
| 2007/0132721 | A1 * | 6/2007 | Glomski | ............. G06F 3/04845 |
| | | | | 345/156 |

(Continued)

OTHER PUBLICATIONS

"Abelian sandpile model", [online], [retrieved on Jul. 12, 2018]. Retrieved from the Internet: <URL: https://en.wikipedia.org/wiki/Abelian_sandpile_model>.

(Continued)

*Primary Examiner* — Jade R Chwasz
(74) *Attorney, Agent, or Firm* — Law Offices of Ira D. Blecker, P.C.

(57) ABSTRACT

A method of creating a 3D holographic display in a device having a camera, holographic projectors and display surface, the method including: tracking by the camera an interactive device over the display; determining by the camera a distance from the interactive device to the display; responsive to an action by the interactive device, visually displaying by the holographic projectors a unit holographic object proximate to the interactive device; responsive to one or more additional actions by the interactive device, visually displaying by the holographic projectors additional unit holographic objects proximate to the unit holographic object so as to be visually displaying a plurality of unit holographic objects; accumulating by the holographic projectors the plurality of unit holographic objects proximate to the display surface; and determining an amount of accumulated unit holographic objects visually displayed by the holographic projectors until a resultant shape of holographic objects is formed.

20 Claims, 4 Drawing Sheets

(56) References Cited

U.S. PATENT DOCUMENTS

2012/0293632 A1* 11/2012 Yukich .................. H04N 5/247
                                                                 348/47
2015/0220058 A1    8/2015  Mukhtarov et al.
2016/0077489 A1    3/2016  Kaufman et al.
2016/0154458 A1    6/2016  Liu et al.

OTHER PUBLICATIONS

"Apple's display tech lets users interact with 3D objects in mid-air", [online], [retrieved on May 17, 2018]. Retrieved from the Internet: <http://appleinsider.com/articles/14/04/24/apples-display-tech-lets-users-interact-with-3d-objects-in-mid-air>.

Luke Edwards, "Holograms are finally here: Plasma lasers used to create images in mid-air", [online], [retrieved on May 17, 2018]. Retrieved from the Internet: <www.pocket-lint.com/news/131622-holograms-are-finally-here-plasma-lasers-used-to-create-images-in-mid-air>.

"Method and system for user interaction based 3D model constriction with grained holographic objects.", An IP.com Prior Art Database Technical Disclosure, IP.com No. IPCOM000249517D, Mar. 2, 2017.

P. Narayanan, Essentials of Biophysics, Second Edition, 2010, Chapter 12 Lasers and Holography, pp. 332-338.

Mary-Ann-Russon,"Touchable 3D holograms in daylight now possible using superfast femtosecond lasers", online], [retrieved on May 17, 2018]. Retrieved from the Internet: <s://www.ibtimes.co.uk/touchable-3d-holograms-daylight-now-possible-using-superfast-femtosecond-lasers-1508599>.

* cited by examiner

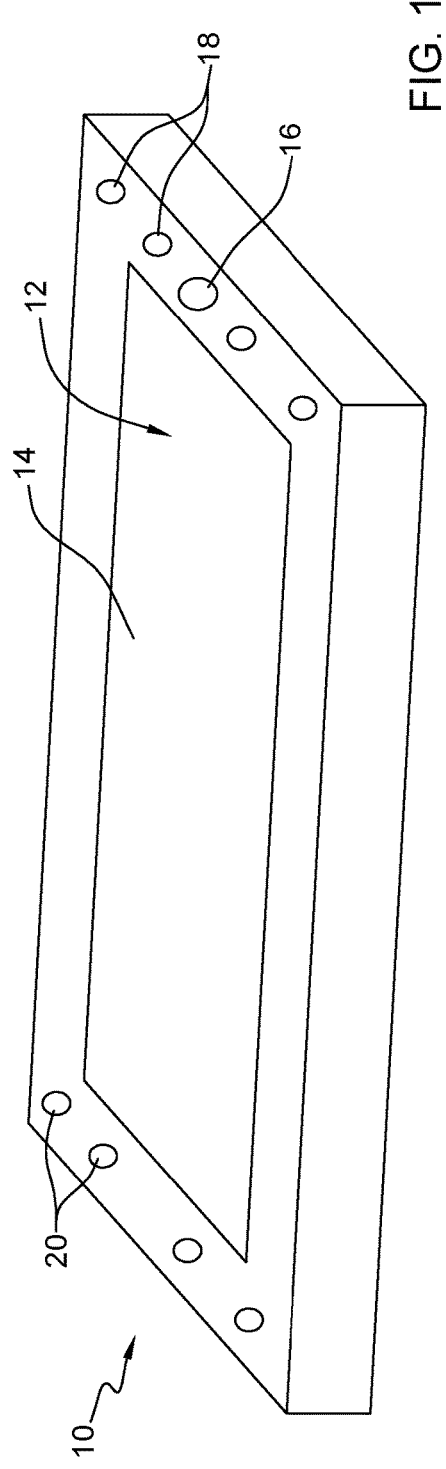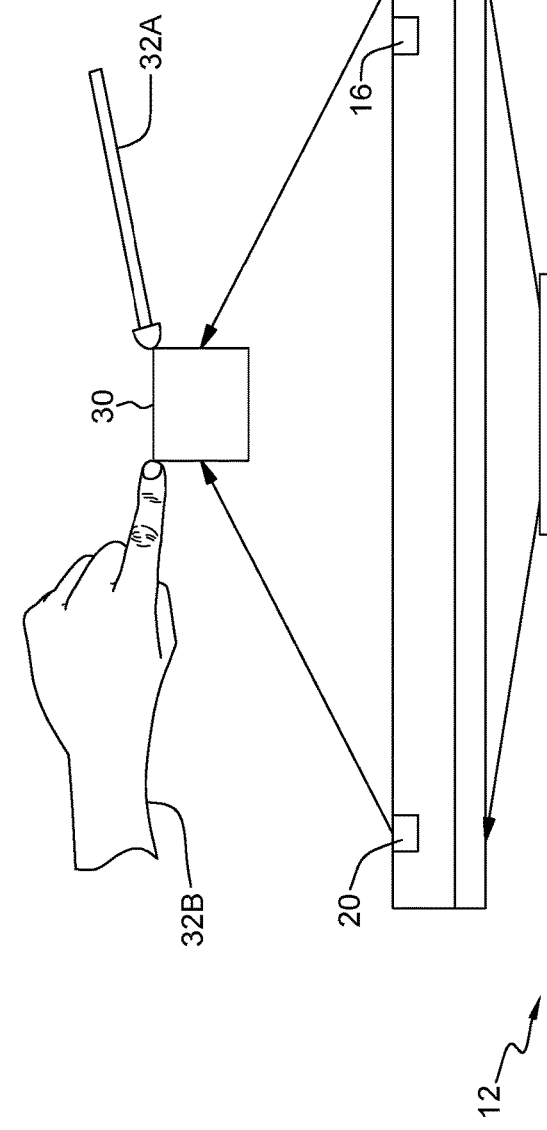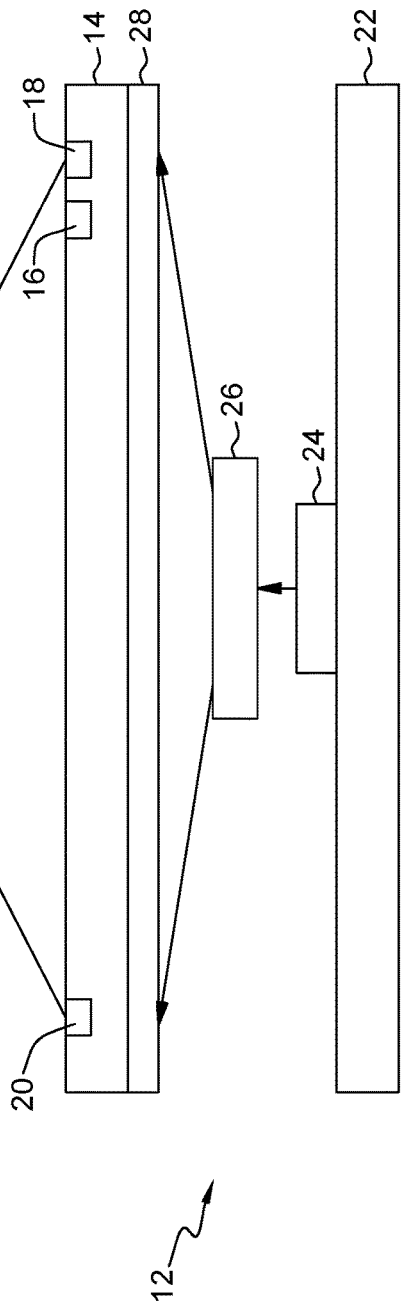

3D HOLOGRAPHIC DISPLAY AND HOLOGRAPHIC OBJECT FORMATION

BACKGROUND

The present exemplary embodiments pertain to holographic displays and, more particularly, to holographic displays in which the displayed object is a three dimensional holographic image.

Next generation computer systems may use holographic objects for various user interactions. The user may have the feeling of interacting with the holographic objects while performing any activity with the physical objects.

BRIEF SUMMARY

The various advantages and purposes of the exemplary embodiments as described above and hereafter are achieved by providing, according to an aspect of the exemplary embodiments, a computer implemented method of creating a 3D (three-dimensional) holographic display in a device having a camera, holographic projectors and a display surface, the method comprising: tracking by the camera an interactive device over the display; determining by the camera a distance from the interactive device to the display; responsive to an action by the interactive device, visually displaying by the holographic projectors a unit holographic object proximate to the interactive device and spaced from the display surface by the distance determined by the camera; responsive to one or more additional actions by the interactive device, visually displaying by the holographic projectors additional unit holographic objects proximate to the unit holographic object so as to be visually displaying a plurality of unit holographic objects including the unit holographic object; accumulating by the holographic projectors the plurality of unit holographic objects proximate to the display surface; and determining an amount of accumulated unit holographic objects visually displayed by the holographic projectors until a resultant shape of holographic objects is formed; wherein the method is performed by a processor.

According to another aspect of the exemplary embodiments, there is provided a computer program product for creating a 3D (three-dimensional) holographic display in a device having a camera, holographic projectors and a display surface, the computer program product comprising a computer readable storage medium having program instructions embodied therewith, the program instructions executable by a processor to cause the processor to perform a method comprising: tracking by the camera an interactive device over the display; determining by the camera a distance from the interactive device to the display; responsive to an action by the interactive device, visually displaying by the holographic projectors a unit holographic object proximate to the interactive device and spaced from the display surface by the distance determined by the camera; responsive to one or more additional actions by the interactive device, visually displaying by the holographic projectors additional unit holographic objects proximate to the unit holographic object so as to be visually displaying a plurality of unit holographic objects including the unit holographic object; accumulating by the holographic projectors the plurality of unit holographic objects proximate to the display surface; and determining an amount of accumulated unit holographic objects visually displayed by the holographic projectors until a resultant shape of holographic objects is formed.

According to a further aspect of the exemplary embodiments, there is provided a system for creating a 3D (three-dimensional) holographic display comprising: a device having a camera, holographic projectors and a display surface; a non-transitory storage medium that stores instructions; and a processor that executes the instructions to perform: tracking by the camera an interactive device over the display; determining by the camera a distance from the interactive device to the display; responsive to an action by the interactive device, visually displaying by the holographic projectors a unit holographic object proximate to the interactive device and spaced from the display surface by the distance determined by the camera; responsive to one or more additional actions by the interactive device, visually displaying by the holographic projectors additional unit holographic objects proximate to the unit holographic object so as to be visually displaying a plurality of unit holographic objects including the unit holographic object; accumulating by the holographic projectors the plurality of unit holographic objects proximate to the display surface; and determining an amount of accumulated unit holographic objects visually displayed by the holographic projectors until a resultant shape of holographic objects is formed.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 1 is a perspective view of an electronic device having a display capable of displaying a 3D holographic image.

FIG. 2 is an elevation view conceptually illustrating the components of the display in the electronic device of FIG. 1.

DETAILED DESCRIPTION

Figure 3:
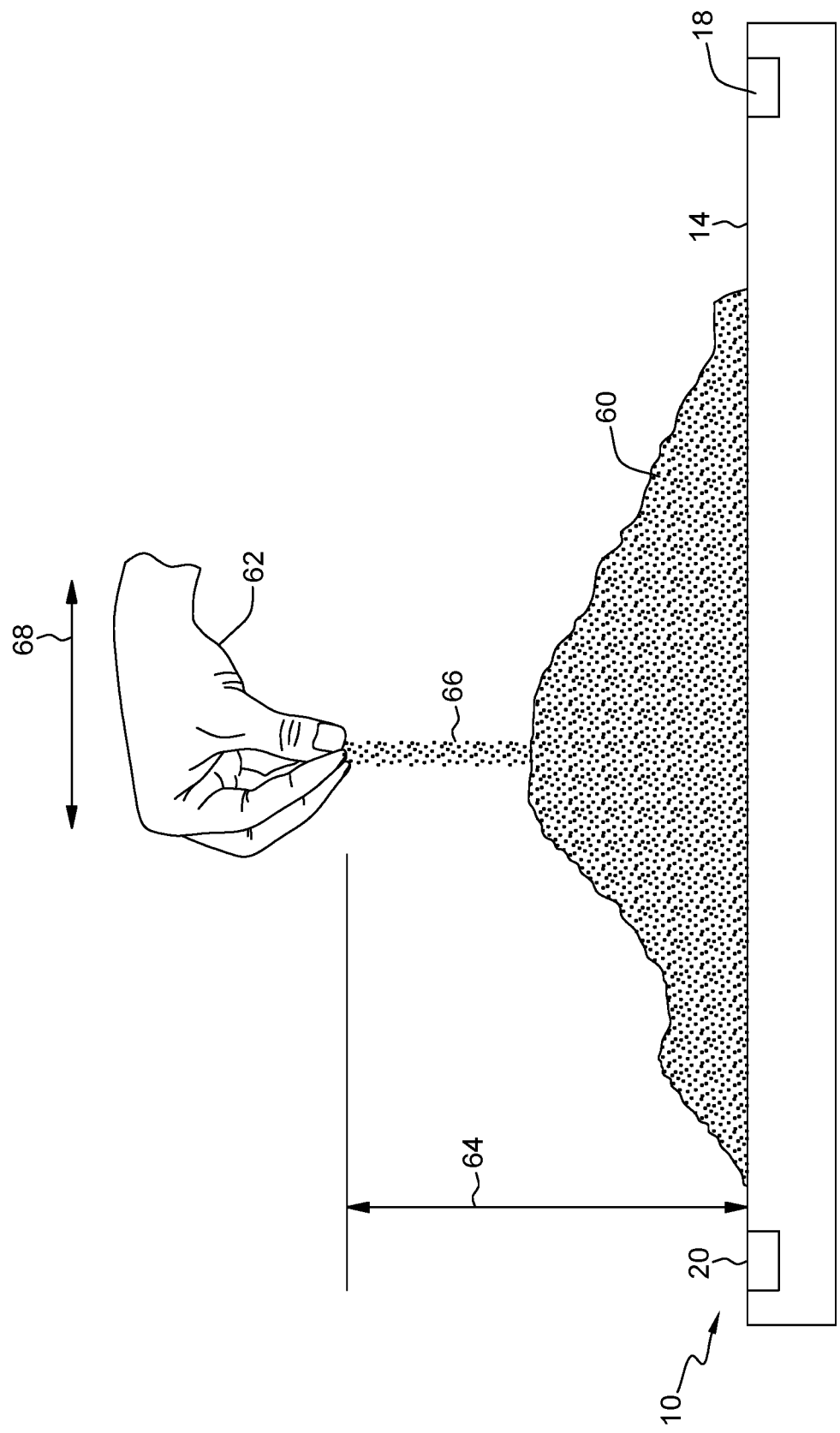
FIG. 3 is an illustration of a 3D holographic image formed according to one or more exemplary embodiments.

One or more exemplary embodiments propose an electronic device, such as a smartphone or a tablet, having a display in which:

There is at least one camera installed in the display that may track the pattern of an interactive device over the display. The interactive device may be a pointer or stylus or may be a hand and/or finger movement of a user. A holographic projection ecosystem may create a plurality of animated unit holographic objects spreading from the interactive device position to the surface of the display. At any point of time, the dimension of the unit holographic object may be changed at any time.

The spreading of the unit holographic objects over the display surface may be aligned with the selected material, for example sand granules, blocks, etc., interactive device movement pattern and position of the interactive device. The camera may analyze the movement of the interactive device over the display and animation may be created for each unit holographic object.

The unit holographic objects may be piling over the display surface to create a 3D (three dimensional) holographic shape. The surface roughness of the 3D holographic object depends on the dimension of the unit holographic object. User can change the dimension of the unit holographic object and can change the surface roughness of the 3D holographic shape.

While the unit holographic objects are spreading over the partially created 3D holographic shape, the impact, sliding, toppling etc. of each unit holographic object will be calculated dynamically based on the selected material property and the dimension/shape of the unit holographic object.

Referring now to the Figures in more detail, and particularly referring to FIG. 1, there is illustrated an exemplary electronic device 10 in which there may be a display 12 which may display typical digital images but may also display holographic images. The display 12 may have a display surface 14. For purposes of illustration and not limitation, the electronic device 10 is a smartphone but could also be any electronic device having a display such as a tablet.

The electronic device 10 may include at least one camera 16 for taking pictures but also having the capability to assist in the formation of 3D holographic images. The electronic device 10 may further include a plurality of holographic projectors which may project a holographic image above the display surface 14. Some of the holographic projectors 18 may be on one side of the display 12 while other of the holographic projectors 20 may be on the other side of the display 12.

FIG. 2 is an elevation view conceptually illustrating the components of display 12 which may have the capability to display holographic images. The display 12 may have a body 22 on which is supported a light source 24. Preferably the light source 24 is a coherent light source such as a laser. Located in line with the light source 24 is an image hologram 26 which may display a three-dimensional (3D) holographic image 30 when illuminated by the light source 24. "Three-dimensional holographic image" 30 refers to a complete three-dimensional image in which, when a displayed image is viewed from a variety of directions, the image appears to be three-dimensional.

The 3D holographic image 30 may be projected onto lens 28 which then focuses the 3D holographic image 30 to be displayed above display surface 14 by holographic projectors 18, 20. Also shown on display surface 14 is the at least one camera 16.

A user may interact with the 3D holographic image 30 with an interactive device 32 which may be, for example, a stylus 32A or a user's hand/finger 32B.

In one or more exemplary embodiments, the 3D holographic image 30 is referred to as a unit holographic object. The display 12 may have a configuration manager by which a user may select the dimension and shape of the unit holographic object. For example, a user may select fine grained sand, coarse grained sand, coral sand etc. Alternatively, the user may select a square shaped block or a hexagonal shaped block.

In one or more exemplary embodiments, once the user selects the dimension of the unit holographic object, each unit holographic object may be the same. The user may change the dimension of the unit holographic object at any time.

The camera 16 may track the interactive device 32 movement over the display 12. Based on stored movement patterns of the interactive device 32, software stored in the electronic device 10 may identify how the unit holographic objects may be spread over the display surface 14.

In addition, the camera 16 may measure the distance of the interactive device 32 to the display surface 14.

Based on the camera measurements of the distance of the interactive device 32 from the display surface 14, the holographic projectors 18, 20 may display a unit holographic object proximate to (i.e.,close to) or at the position of the interactive device 32 and thereafter may display additional unit holographic objects proximate to the first unit holographic object so as to display a plurality of unit holographic objects. The plurality of unit holographic objects may be displayed as a group to form a defined structure or may be displayed as a flow of unit holographic objects that may appear to be falling from the interactive device 32 towards the display surface.

The display of each unit holographic object will be according to the dimension of the unit holographic object based on the selected dimension of the unit holographic object previously configured by the user.

The camera 16 may identify the relative coordinates of the interactive device 32 with respect to the display and accordingly will identify where the unit holographic objects may be spreading.

Then, knowing the dimension and shape of the unit holographic objects, the movement of the interactive device 32 over the display 12, the distance of the interactive device 32 from the display 12 and the relative coordinates of the interactive device 32, the holographic projectors 18, 20 may create an animated impression in such a way that the user will view the unit holographic objects spreading from the interactive device 32 to the display surface 14.

The camera 16 may calculate the speed of movement of the interactive device 32 around the display surface 14. If the interactive device 32 is a user's hand or finger movement, the speed of the opening of the hand or movement around the display surface 14 may be calculated. If the interactive device 32 is a stylus or similar device, the speed of the movement of the stylus around the display surface 14 may be calculated. Accordingly, a rate of spreading of the unit holographic objects over the display 12 may be calculated.

Based on the time of spreading in one place, the amount of accumulated unit holographic objects may calculated.

The above calculations may rely on the sandpile model in which "grains of sand" (or "chips") are randomly placed onto the sandpile, until the slope exceeds a specific threshold value at which time that site collapses transferring sand into the adjacent sites, increasing their slope. Based on the sandpile model, the resultant shape of the 3D holographic image over the display surface 14 may be calculated.

The holographic projectors 18, 20 may create the resultant 3D holographic image in such a way that the user will visualize that he/she has created the resultant 3D holographic image by visually spreading unit holographic objects over the display surface 14. If the user, for example, has configured the unit holographic objects to be grains of sand, the user will visualize that he/she is moving grains of sand from the interactive device 32 to the display surface 14.

Referring to FIG. 3, there is an illustration of the formation of a 3D holographic image 60. A user has configured the electronic device 10 such that the unit holographic objects may be grains of sand. A user's hand 62 is in proximity to the electronic device 10, and particularly in proximity to the display surface 14. By a gesture or manually activating an application on the electronic device 10, the user may begin the formation of the 3D holographic image 60. The user may move his/her fingers to indicate a flow of grains or speed of grains moving from the user's hand 62. The user's hand 62 may additionally move back and forth over the display surface 14 as indicated by arrows 68. The camera 16 picks up the user's gesture, proximity to the display surface 14 and speed of movement of the user's hand 60 and through a computer program, it is determined that the user's hand 62 is indicating a flow of grains of sand. The camera 16 may measure the distance 64 between the user's hand 62 and the display surface 14. This distance is variable as a new hologram is created as each grain of sand drops to the 3D holographic image 60 such that a seemingly moving image of grains dropping to the display surface 14 or on to the 3D holographic image 60 is displayed. This distance information is relayed to the holographic projectors 18, 20 to display the flow 66 of grains of sand and the accumulation of the grains of sand on the display surface 14 to form the 3D holographic image 60.

Figure 4:
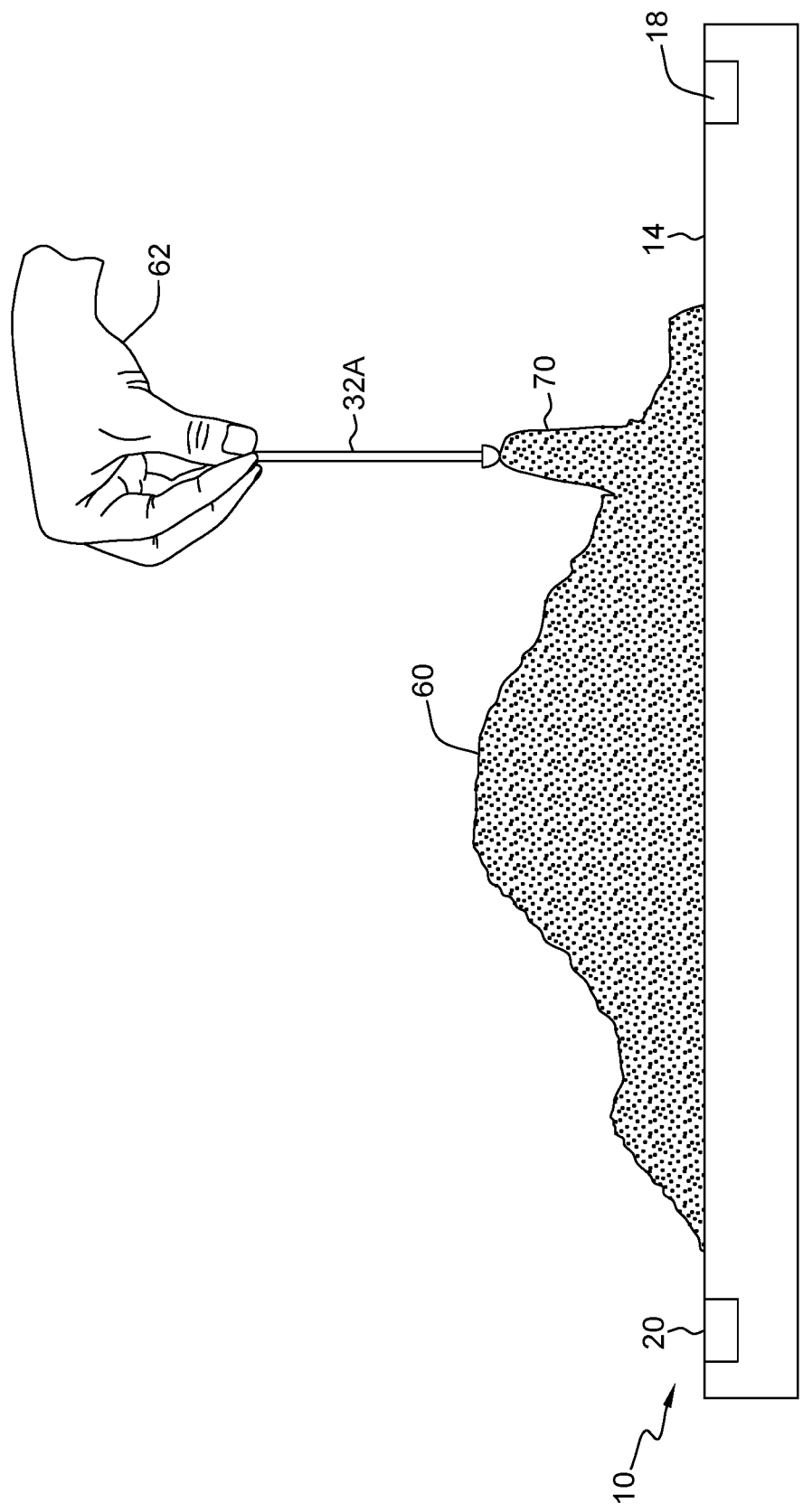
FIG. 4 is an illustration of the 3D holographic image formed in FIG. 3 and which may be sculpted by an interactive device.

Referring now to FIG. 4, the interactive device 32, which in this case is the stylus 32A but could also be the user's hand 62, has caused a change in the configuration of the 3D holographic image 60 by forming a 3D holographic feature 70. According to one or more exemplary embodiments, the 3D holographic image may be 'sculpted" by use of an interactive device 32 to change the shape of the 3D holographic image by spreading the 3D holographic image 60 or by forming 3D holographic features in or on the 3D holographic image 60.

The electronic device 10 may include a computing device 34 that provides the intelligence for the electronic device 10 and operates the display 12 to form the 3D holographic image.

Figure 5:
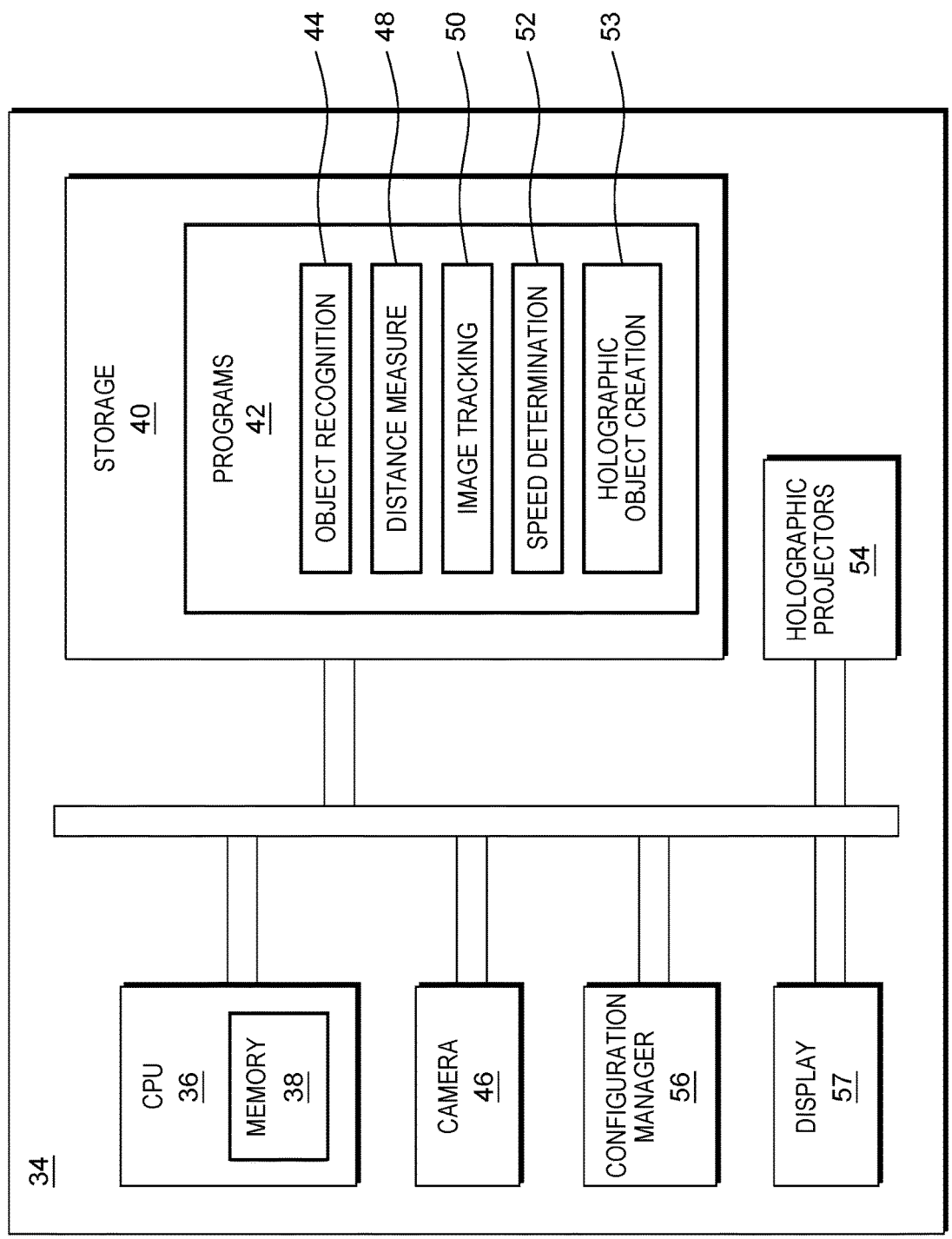
FIG. 5 illustrates a computing device that provides the intelligence for the electronic device and operates the display to form the 3D holographic image.

FIG. 5 illustrates details of the computing device 34. Included within computing device 34 may be a processor such as central processing unit (CPU) 36 having memory 38. Also included may be storage 40 having computer programs 42. Storage 40 may be resident within the computing device 34 or may be remotely located such as in the cloud. Among the computer programs 42 may be an object recognition program 44 to receive input from the camera 16 and process the images received from the camera 16.

The computing device 34 may further include camera instructions 46 to operate the camera 16.

Further included within computer programs 42 may be additional computer programs for operating the camera 16 including a distance measuring program 48 to measure, for example, the distance between the interactive device 32 and the display surface 14, an image tracking program 50 to track the interactive device 32 and a speed calculating program 52 to determine the movement speed of the interactive device 32. A further computer program 42 may be a computer program for holographic object creation 53.

Also included within computing device 34 may be holographic projector instructions 54 to operate the holographic projectors 18, 20, configuration manager instructions 56 to provide an interface for a user to initialize and modify the unit holographic objects and display instructions 57 to operate the display 12.

In operation, a user may configure by the configuration manager the unit holographic objects. The holographic object creation program 53 may create a hologram or a series of holograms according to the configuration provided by the configuration manager. The hologram or series of holograms may be provided to the holographic projectors 18, 20 by the holographic projectors instructions 54. The holographic projectors 18, 20 may then cause the holograms or series of holograms to be displayed such as shown in FIGS. 3 and 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer implemented method of creating a 3D (three-dimensional) holographic display in a device having a camera, holographic projectors and a display surface, the method comprising:
   tracking by the camera an interactive device over the display;
   determining by the camera a distance from the interactive device to the display;
   responsive to an action by the interactive device, visually displaying by the holographic projectors a unit holographic object according to the action by the interactive device proximate to the interactive device and spaced from the display surface by the distance determined by the camera, wherein the unit holographic object is a 3D holographic image;
   responsive to one or more additional actions by the interactive device, visually displaying by the holographic projectors additional unit holographic objects according to the one or more additional actions by the interactive device proximate to the unit holographic object so as to be visually displaying a plurality of unit holographic objects including the unit holographic object, wherein the additional unit holographic objects are each a 3D holographic image;
   accumulating by the holographic projectors the plurality of unit holographic objects proximate to the display surface; and
   determining an amount of accumulated unit holographic objects visually displayed by the holographic projectors until a resultant shape of the accumulated holographic objects is formed;
   wherein the method is performed by a processor.

2. The method of claim 1 wherein visually displaying by the holographic projectors additional unit holographic objects appears visually to be the plurality of unit holographic objects falling from the interactive device toward the display surface.

3. The method of claim 1 further comprising configuring the unit holographic objects to include dimensions of the unit holographic objects and a material of the unit holographic objects.

4. The method of claim 3 wherein visually displaying by the holographic projectors a plurality of unit holographic objects includes using at least the dimension of the unit holographic objects in the visual displaying of the unit holographic objects.

5. The method of claim 1 further comprising determining by the camera according to a gesture of the interactive device over the display surface a rate of the unit holographic objects accumulating.

6. The method of claim 1 further identifying by the camera coordinates of the interactive device with respect to the display surface to identify where the holographic objects are accumulating on the display surface.

7. The method of claim 1 wherein the unit holographic objects are selected from the group of sand particles and magnetic particles.

8. A computer program product for creating a 3D (three-dimensional) holographic display in a device having a camera, holographic projectors and a display surface, the computer program product comprising a computer readable storage medium having program instructions embodied therewith, the program instructions executable by a processor to cause the processor to perform a method comprising:
- tracking by the camera an interactive device over the display;
- determining by the camera a distance from the interactive device to the display;
- responsive to an action by the interactive device, visually displaying by the holographic projectors a unit holographic object according to the action by the interactive device proximate to the interactive device and spaced from the display surface by the distance determined by the camera, wherein the unit holographic object is a 3D holographic image;
- responsive to one or more additional actions by the interactive device, visually displaying by the holographic projectors additional unit holographic objects according to the one or more additional actions by the interactive device proximate to the unit holographic object so as to be visually displaying a plurality of unit holographic objects including the unit holographic object, wherein the additional unit holographic objects are each a 3D holographic image;
- accumulating by the holographic projectors the plurality of unit holographic objects proximate to the display surface; and
- determining an amount of accumulated unit holographic objects visually displayed by the holographic projectors until a resultant shape of the accumulated holographic objects is formed.

9. The computer program product of claim 8 wherein visually displaying by the holographic projectors additional unit holographic objects appears visually to be the plurality of unit holographic objects falling from the interactive device toward the display surface.

10. The computer program product of claim 8 wherein the method further comprising configuring the unit holographic objects to include dimensions of the unit holographic objects and a material of the unit holographic objects.

11. The computer program product of claim 10 wherein visually displaying by the holographic projectors a plurality of unit holographic objects includes using at least the dimension of the unit holographic objects in the visual displaying of the unit holographic objects.

12. The computer program product of claim 8 wherein the method further comprising determining by the camera according to a gesture of the interactive device over the display surface a rate of the unit holographic objects accumulating.

13. The computer program product of claim 8 further identifying by the camera coordinates of the interactive device with respect to the display surface to identify where the holographic objects are accumulating on the display surface.

14. A system for creating a 3D (three-dimensional) holographic display comprising:
- a device having a camera, holographic projectors and a display surface;
- a non-transitory storage medium that stores instructions; and
- a processor that executes the instructions to perform:
  - tracking by the camera an interactive device over the display;
  - determining by the camera a distance from the interactive device to the display;
  - responsive to an action by the interactive device, visually displaying by the holographic projectors a unit holographic object according to the action by the interactive device proximate to the interactive device and spaced from the display surface by the distance determined by the camera, wherein the unit holographic object is a 3D holographic image;
  - responsive to one or more additional actions by the interactive device, visually displaying by the holographic projectors additional unit holographic objects according to the one or more additional actions by the interactive device proximate to the unit holographic object so as to be visually displaying a plurality of unit holographic objects including the unit holographic object, wherein the additional unit holographic objects are each a 3D holographic image;
  - accumulating by the holographic projectors the plurality of unit holographic objects proximate to the display surface; and
  - determining an amount of accumulated unit holographic objects visually displayed by the holographic projectors until a resultant shape of the accumulated holographic objects is formed.

15. The system of claim 14 wherein visually displaying by the holographic projectors additional unit holographic objects appears visually to be the plurality of unit holographic objects falling from the interactive device toward the display surface.

16. The system of claim 14 wherein the processor that executes the instructions to additionally perform configuring the unit holographic objects to include dimensions of the unit holographic objects and a material of the unit holographic objects.

17. The system of claim 16 wherein visually displaying by the holographic projectors a plurality of unit holographic objects includes using at least the dimension of the unit holographic objects in the visual displaying of the unit holographic objects.

18. The system of claim 14 wherein the processor that executes the instructions to additionally perform determining by the camera according to a gesture of the interactive device over the display surface a rate of the unit holographic objects accumulating.

19. The system of claim 14 further identifying by the camera coordinates of the interactive device with respect to the display surface to identify where the holographic objects are accumulating on the display surface.

20. The system of claim 14 wherein the unit holographic objects are selected from the group of sand particles and magnetic particles.

* * * * *